Figure 1:
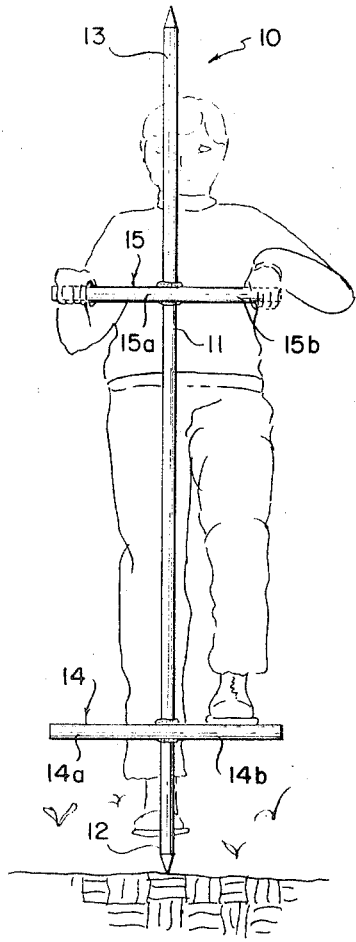

United States Patent [19]
Pollard

[11] 3,838,739
[45] Oct. 1, 1974

[54] EARTH PERFORATING IMPLEMENT

[76] Inventor: David E. Pollard, 8405 Tobin Rd., Annandale, Va. 22003

[22] Filed: June 5, 1973

[21] Appl. No.: 367,164

[52] U.S. Cl. .................................. 172/21, 172/375
[51] Int. Cl. ............................................ A01b 45/02
[58] Field of Search ....... 172/21, 22, 372, 375, 371; 111/99, 4, 92; 175/19; 294/50.5, 50.7

[56] References Cited
UNITED STATES PATENTS

| | | | |
|---|---|---|---|
| 500,476 | 6/1893 | Douthit | 111/99 |
| 551,527 | 12/1895 | Cunningham | 111/99 X |
| 2,207,741 | 7/1940 | Kimble | 111/99 |
| 2,439,524 | 4/1968 | Moore | 111/99 UX |
| 2,629,985 | 3/1953 | McDowell | 175/19 X |

Primary Examiner—Stephen C. Pellegrino

[57] ABSTRACT

An earth perforating implement is provided wherein the effective reach of the implement into the earth beyond first and second projecting means carried on shaft means of the implement differs in order that a hole produced to an initial depth in the earth using one end of the implement can be deepened using the opposite end of the implement, the first projecting means being adapted to receive foot pressure application from the user of the implement in forming the hole to the initial depth and the second projecting means being adapted to receive foot pressure application from the user of the implement in deepening the hole from the given depth.

6 Claims, 2 Drawing Figures

EARTH PERFORATING IMPLEMENT

The present invention relates to earth perforating implements, and more especially is concerned with hand implements which are foot powered by a person for producing a hole in the earth with the implement.

An object of this invention is the provision of a practical and effective earth perforating implement which is adapted to receive foot applied body weight from a person both during use of the implement to produce a hole in the earth to an initial depth and thereafter during end for end use of the implement for deepening that hole by a considerable amount.

Another object herein is that of providing an implement of the character indicated having projections which, as the implement is moved end for end from a one end earth perforating position to an opposite end earth perforating position, are carried from down and up positions to up and down positions, and are adapted to be manually grasped in the up position and to receive foot pressure application in the down position, for manually controlling and driving the implement into the earth.

Other objects of the present invention in part will be obvious and in part pointed out more fully hereinafter.

In accordance with the present invention, foot powered hand implements for producing holes in the earth are provided which are characterized by having first and second perforating members affording opposite ends of the implement, there being shaft means interconnecting those members. First and second projecting means leading transversely of the shaft means and carried by the latter, and being spaced apart longitudinally of the shaft means, are furthermore interrelated with the ends of the first and second earth perforating members so that a hole produced to a depth in the earth through use of the end of the first perforating member can be deepened considerably by turning the implement end for end and using the end of the second perforating member. In this respect, the end of the first perforating member is disposed in the implement a distance away from the first projecting means to allow a hole to be produced in the earth to an initial depth using the end of the first perforating member to lead the shaft means in this operation while downward foot pressure is applied to the second projecting means. Further, the end of the second perforating member is disposed in the implement a greater distance from the second projecting means than the perforating end of the first perforating member is disposed from the first projecting means for the hole initially produced with the first perforating member to be deepened by a user of the implement placing the end of the second perforating member against the bottom of the hole and applying downward foot pressure to the second projecting means.

In embodiments which are preferred, the effective reach of the implement into the earth beyond the second projecting means to the end of the second perforating member is approximately double the effective reach of the implement into the earth beyond the first projecting means to the end of the first perforating member, such that at the outset of using the end of the second perforating member on the bottom of the initially formed hole the second projecting means is accessible in an effective position above the surface of the earth for receiving downward foot pressure from a user of the implement much as was the first projecting means at the outset of using the perforating end of the first perforating member. Also, in embodiments herein which are preferred, each of the first and second projecting means includes a pair of projecting portions leading transversely of the shaft means outwardly from the shaft means generally oppositely for a user of the implement to manually grip the then uppermost pair of projecting portions, and stand with both feet upon the then lowermost pair of projecting portions and thus supply foot pressure to the implement, whether the implement is being operated to produce a hole to an initial depth or has been turned end for end and is being operated for deepening the hole initially formed.

Figure 2:
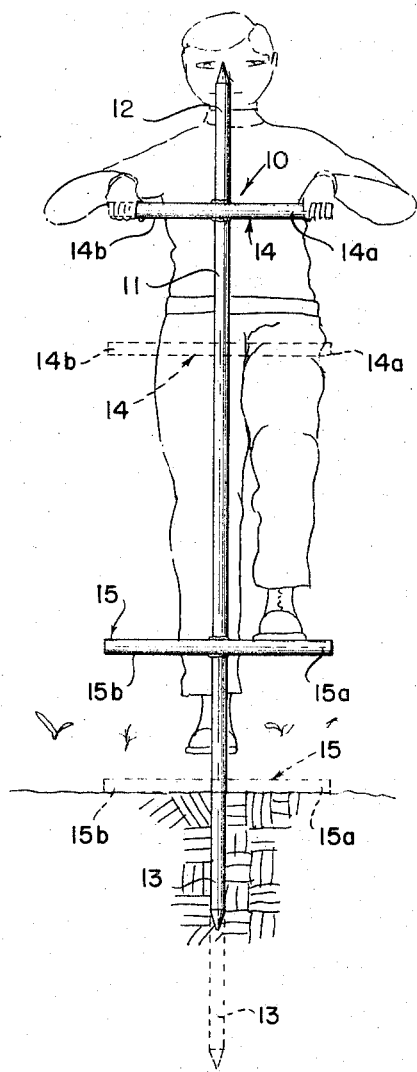

In the accompanying drawing wherein a preferred embodiment of the present invention is illustrated:

FIG. 1 is a vertical elevation representing an earth perforating implement poised over the surface of the earth into which a hole is to be dug; and FIG. 2 is a vertical elevation representing the earth perforating implement of FIG. 1 turned end for end and inserted in readiness for being operated to deepen a hole already produced with the implement by working downwardly from the FIG. 1 position.

Referring now more particularly to the accompanying drawing an earth perforating implement generally designated by the reference numeral 10 is provided comprising a straight shaft or bar 11, such as of steel, having an earth perforating first end member 12 and an earth perforating opposite second end member 13, which in the present embodiment are tapered converging to earth perforating tips thereof. Members 12 and 13 are integral portions of the shaft 11 and the bar carries intermediate those members a first projecting means 14 and a second projecting means 15 which serve as hand holds and foot rests of the implement as will be further explained hereinafter.

The first and second projecting means 14 and 15 are of tubular or bar form, such as of steel, each being produced having transversely centrally of the length thereof an aperture into which the shaft 11 is received and suitably secured to the first and second projecting means, as by welding, thus for the first projecting means to include portions 14a and 14b leading outwardly oppositely on an axis which is transverse to the shaft 11 and for the second projecting means to include portions 15a and 15b leading outwardly on an axis which also is transverse to the shaft 11 but is spaced longitudinally of the latter shaft from the first projecting means 14.

The earth perforating first end member 12 is disposed in the implement 10 a distance away from the first projecting means 14 so as starting with the implement in the position represented in FIG. 1 a hole can be produced in the earth to an initial depth using the end of the first perforating member to lead the shaft in this operation while a user of the implement holds the portions 15a and 15b manually and applies foot pressure to the implement by standing upon the projections 14a and 14b. Through such operations a hole is formed in the earth to initial depth such as in the environs of a tree which is to be root fed with fertilizer. Upon attaining the hole to an initial depth, the implement is turned end for end and is inserted back into the hole, as is represented in FIG. 2, and thus is put in readiness for the hole to be deepened. In this respect, the end of second perforating member 13 is disposed in the implement a considerably greater distance from the second projecting means 15 than the perforating end of the first perforating member 12 is disposed from the first projecting means 14. The deepening is attained by a user of the implement grasping the projections 14a and 14b and applying weight having his feet on the projections 15a and 15b.

In tree root feeding through use of the implement, deep holes accordingly are produced in the environment of the tree roots and fertilizer is filled into the holes thus eventually to leach out into the adjacent soil and supply the tree with nourishment.

As the invention lends itself to many possible embodiments and as many possible changes may be made in the embodiment hereinbefore set forth, it will be distinctly understood that all matter described herein is to be interperted as illustrative and not as a limitation.

I claim:

1. An earth perforating implement, comprising, first and second earth perforating members and shaft means interconnecting said earth perforating members, said first and second earth perforating members including oppositely directed first and second earth perforating ends of the implement for a hole to be produced in the earth and extended with said earth perforating ends; and first and second projecting means united with said shaft means and leading outwardly transversely of said shaft means and being spaced apart from said first and second earth perforating ends respectively and from one another having the distance of said second earth perforating end from said second projecting means approximately double the distance of said first earth perforating end from said first projecting means, for a user of the implement to apply foot pressure to said first projecting means and manually grip said second projecting means in producing a hole in the earth with said first perforating end, and for said implement inverted and inserted bringing said second earth perforating end against the bottom of the hole to have lowered said first and second projecting means by an amount represented by the depth of the hole and into accessible positions to have a user of the implement thereafter grip said first projecting means manually and apply foot pressure upon said second projecting means to deepen the hole.

2. An earth perforating implement as set forth in claim 1 wherein each of said first and second projecting means includes a pair of projecting portions leading from said shaft means and longitudinally oppositely directionally on an axis which is transverse to said shaft means.

3. An earth perforating implement as set forth in claim 2 wherein each of said first and second projecting means includes a cross member having an aperture intermediately of said pair of projecting portions of said projecting means, and said cross member accommodating said shaft means in said aperture and being secured to said shaft means.

4. An earth perforating implement as set forth in claim 1 wherein said first and second earth perforating ends of the implement are longitudinally outwardly convergent ends.

5. An earth perforating implement, comprising, shaft means and first and second longitudinally outwardly convergent oppositely directed earth perforating ends of said shaft means for a hole to be produced in the earth and extended with said convergent earth perforating ends, and first and second projecting means united with said shaft means and each of said projecting means including a pair of oppositely projecting portions leading outwardly longitudinally transversely of said shaft means, said first and second projecting means being spaced apart from said first and second convergent earth perforating ends respectively and from one another longitudinally of said shaft means having the distance of said second convergent earth perforating end from said second projecting means approximately double the distance of said first convergent earth perforating end from said first projecting means, for a user of the implement to apply foot pressure to said projecting portions of said first projecting means and manually grip said projecting portions of said second projecting means in producing a hole in the earth with said first convergent earth perforating end, and for said implement inverted and inserted bringing said second convergent earth perforating end against the bottom of the hole to have lowered said first and second projecting means by an amount represented by the depth of the hole and into accessible positions to have a user of the implement thereafter grip said projecting portions of said first projecting means manually and apply foot pressure upon said projecting portions of said second projecting means to deepen the hole.

6. An earth perforating implement as set forth in claim 5 wherein each of said first and second projecting means includes a cross member and each of said cross members comprises one of said pairs of projecting portions and has an aperture transversely intermediately of said pair of projecting portions thereof, said cross member accommodating said shaft means in said aperture and being secured to said shaft means.

* * * * *